(12) United States Patent
Newburry

(10) Patent No.: US 7,157,060 B1
(45) Date of Patent: Jan. 2, 2007

(54) CATALYTIC CONVERTER AND CATALYST ELEMENT THEREFOR

(75) Inventor: Donald M. Newburry, Broken Arrow, OK (US)

(73) Assignee: Miratech Corporation, Tulsa, OK (US)

( * ) Notice: Subject to any disclaimer, the term of this patent is extended or adjusted under 35 U.S.C. 154(b) by 819 days.

(21) Appl. No.: 10/279,264

(22) Filed: Oct. 24, 2002

(51) Int. Cl.
*B01D 50/00* (2006.01)

(52) U.S. Cl. ...................... 422/177; 422/168
(58) Field of Classification Search ............... 422/177, 422/179, 180, 222; 60/299, 300
See application file for complete search history.

(56) References Cited

U.S. PATENT DOCUMENTS

| | | |
|---|---|---|
| 3,615,255 A | 10/1971 | Patterson et al. |
| 3,644,098 A | 2/1972 | De Palma et al. |
| 4,601,168 A | 7/1986 | Harris |
| 4,693,337 A | 9/1987 | Timmermeister |
| 4,843,815 A | 7/1989 | Smojver |
| 4,849,185 A | 7/1989 | Wittig |
| 5,016,438 A | 5/1991 | Harris |
| 5,169,604 A | 12/1992 | Crothers, Jr. |
| 5,184,464 A | 2/1993 | Harris |
| D351,608 S | 10/1994 | Cox |
| 5,746,986 A | 5/1998 | Pollock et al. |
| 5,921,079 A | 7/1999 | Harris |

*Primary Examiner*—Tom P. Duong
(74) *Attorney, Agent, or Firm*—Fellers, Snider, Blankenship, Bailey & Tippens, P.C.; Dennis D. Brown

(57) ABSTRACT

An industrial catalytic converter and a removable catalyst element therefor wherein a solid extension is secured on the catalyst element such that, when the catalyst element is positioned in the converter housing, the solid extension will project into the element insertion channel of the housing in a manner effective to at least partially block the flow of exhaust gas around the catalyst element.

8 Claims, 3 Drawing Sheets

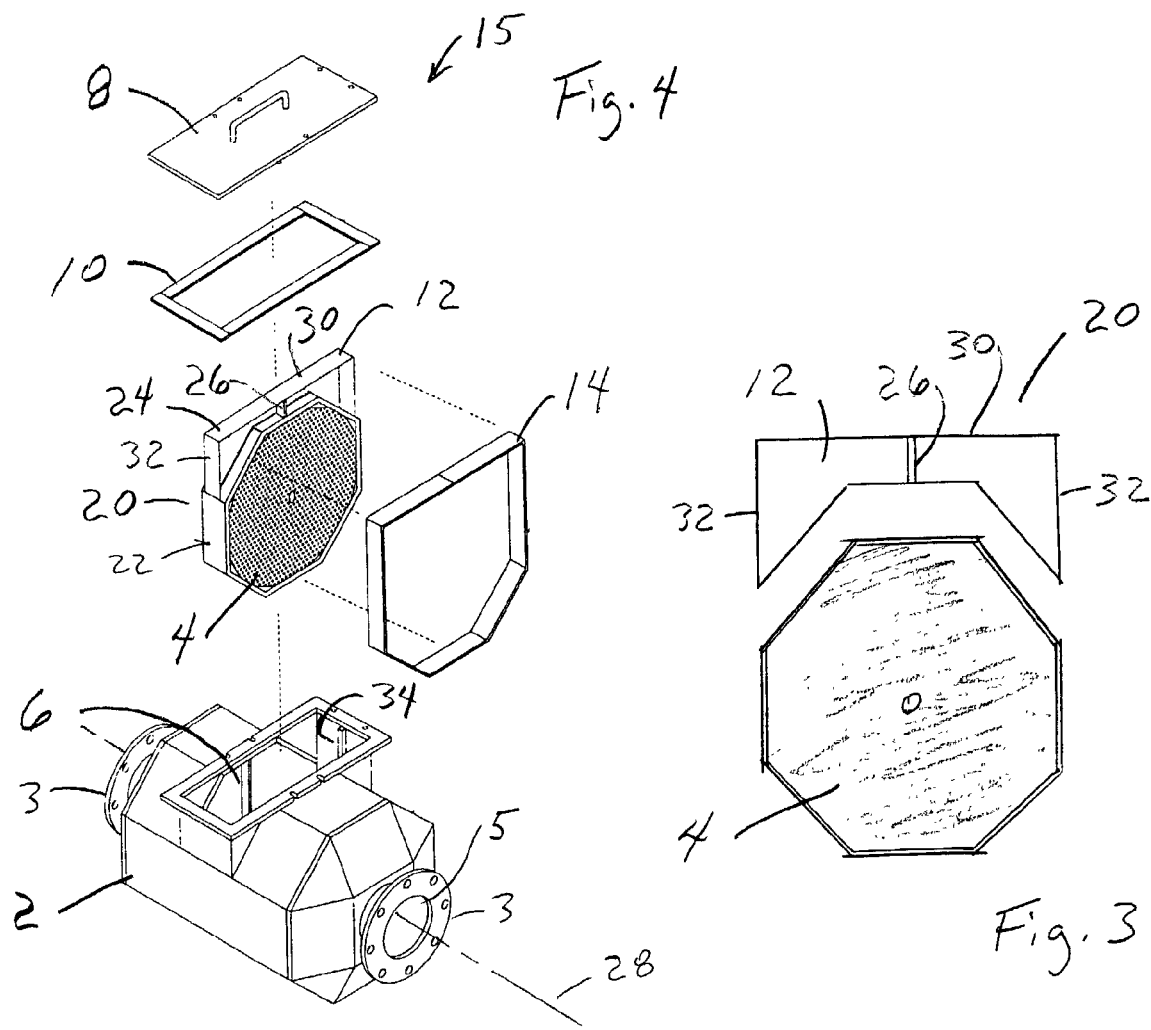

CATALYTIC CONVERTER AND CATALYST ELEMENT THEREFOR

FIELD OF THE INVENTION

The present invention relates to catalytic converters and catalyst elements therefor. More particularly, but not by way of limitation, the present invention relates to catalytic converters, and catalyst elements therefor, for use with industrial engines.

BACKGROUND OF THE INVENTION

Emissions control systems for industrial engines, particularly large, stationary, reciprocating engines, commonly include catalytic converters having removable catalyst elements. The use of removable elements allows periodic inspection, cleaning, and replacement of the catalyst elements without removing or replacing the catalytic converter housing.

A catalytic converter assembly 1 of the type heretofore used in the art, as well as a removable catalyst element 4 therefor, are depicted in FIGS. 1 and 2. The catalytic converter assembly 1 comprises: a housing 2 wherein one or more (typically a plurality) of the catalyst elements 4 are removably received; a pair of flanges or other connections 3 provided on the longitudinal ends of housing 2 for installing the catalytic converter assembly 1 in an engine exhaust system; an exhaust gas flow passage 5 extending longitudinally through the housing 2; an insertion channel 6 projecting from and extending laterally across housing 2 for inserting the catalyst element(s) 4 into housing 2 such that the element(s) 4 extend laterally across the exhaust flow passage 5; and a cover 8 removably secured on the outer end of insertion channel 6 for closing the converter assembly 1. The catalyst element 4 and the lateral interior cross section of the converter housing 2 have corresponding octagonal shapes.

Unfortunately, a common problem with the catalytic converter assemblies heretofore used in the art is that it has been difficult to achieve and maintain an adequate seal around the perimeter of the catalyst element(s) 4. In this regard, it has been particularly difficult to adequately ensure that exhaust gas does not bypass the catalyst element(s) 4 by flowing into the insertion channel 6 and over the top of the element(s) 4. When exhaust gas bypasses the catalyst element(s) 4, the exhaust stream is not adequately clean and pollutant emissions can be significantly higher than desired.

The approach used heretofore for attempting to seal the insertion channel 6 to prevent exhaust gas from flowing over the top of the catalyst element(s) 4 has typically involved installing a heat resistant padding or mat material in the insertion channel 6 above catalyst element(s) 4. However, the use of a padding or mat material of this type has not been sufficiently effective or reliable.

SUMMARY OF THE INVENTION

The present invention provides an improved catalytic converter assembly and catalyst element therefor which satisfy the needs and alleviate the problems mentioned above. The improvements provided by the present invention are very low cost and are extremely effective for preventing exhaust gas from bypassing the catalyst element(s). The inventive modifications are also helpful for facilitating the insertion and removal of the catalyst elements from the converter housing.

In one aspect, the present invention provides an improvement to a catalytic converter wherein the catalytic converter includes: a housing having a longitudinal flow passage; at least one catalyst element removably positionable in the housing across the longitudinal flow passage; an insertion channel projecting from the housing for insertion of the catalyst element; and a cover removably positionable on the outer end of the insertion channel. In accordance with the present invention, the improvement comprises a solid extension secured on the catalyst element such that, when the catalyst element is positioned in the housing, the solid extension will project into the insertion channel in a manner effective to at least partially block flow around the catalyst element.

In another aspect, the present invention provides an improvement for a catalyst element wherein the catalyst element is positionable in a catalytic converter housing across a longitudinal flow passage and the catalyst element is removably insertable in the housing via an insertion channel projecting from the housing. In accordance with the present invention, the improvement comprises a solid extension secured on the catalyst element such that, when the catalyst element is positioned in the catalytic converter housing, the solid extension will project into the insertion channel in a manner effective to at least partially block flow around the catalyst element.

Further objects, features, and advantages of the present invention will be apparent to those skilled in the art upon examining the accompanying drawings and upon reading the following detailed description of the preferred embodiments.

BRIEF DESCRIPTION OF THE DRAWINGS

FIG. 3 provides an exploded front elevational view of an embodiment 20 of the improved catalytic converter element provided by the present invention.

FIG. 4 provides an exploded perspective view of an embodiment 15 of the improved catalytic converter assembly provided by the present invention.

DETAILED DESCRIPTION OF THE PREFERRED EMBODIMENTS

Figure 2:
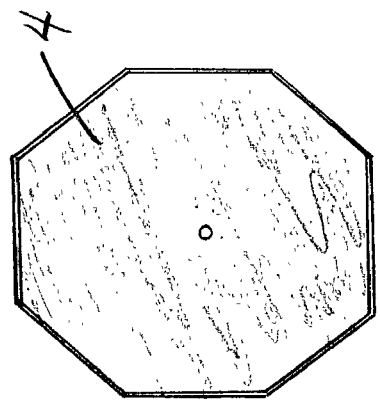
FIG. 2 provides a front elevational view of a prior art catalyst element 4 which is removably insertable in the prior art catalytic converter assembly 1.
Figure 1:
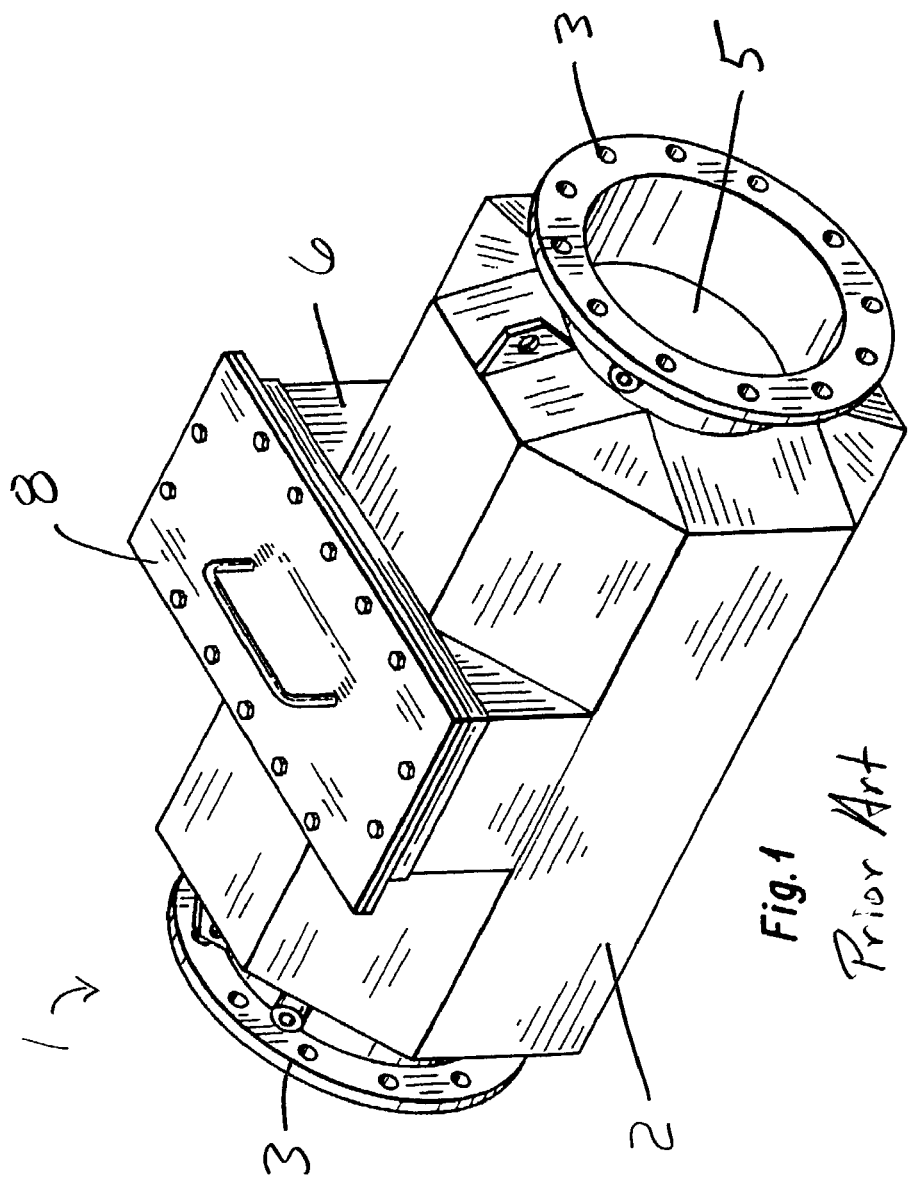
FIG. 1 provides a perspective view of a prior art catalytic converter assembly 1.

An embodiment 15 of the inventive catalytic converter assembly is depicted in FIG. 4. As with the prior art assembly 1, the inventive converter assembly 15 comprises: a housing 2 having end flanges or other connection elements 3; an exhaust gas flow passage 5 extending longitudinally through housing 2; a catalyst element insertion channel 6 projecting from and extending laterally across housing 2; a cover 8 removably positionable on the outer end of insertion channel 6; and a cover gasket 10 positioned on the outer rim of insertion channel 6 for sealing against the cover 8.

Figure 5:
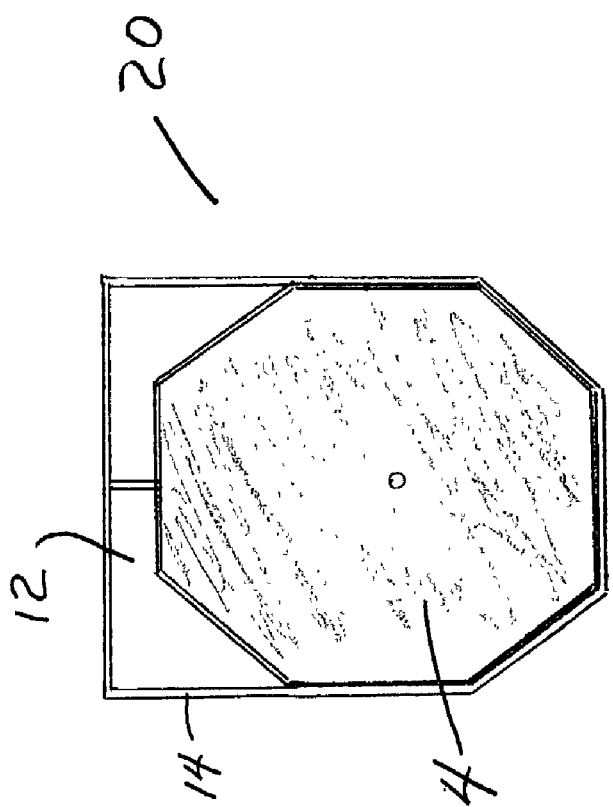
FIG. 5 provides a front elevational view of the inventive catalytic converter element 20.

An inventive catalyst element 20 which is particularly well suited for use in inventive converter assembly 15 is depicted in FIGS. 3, 4, and 5. The inventive catalyst element 20 preferably comprises a catalyst element 4 of the type described above for use in prior art converter assembly 1 and a solid extension 12 attached to (e.g., by welding or other suitable means) and projecting radially from the upper portion of the outer peripheral wall 22 of catalyst element 4. As used herein and in the claims, the term "solid" refers to generally any substantially impervious material or structure which will block the flow of exhaust gas over the catalyst element 4. In a particularly preferred embodiment, the solid extension 12 is a unitary structure formed from a single piece of sheet metal. The extension 12 is preferably bent or formed to provide a substantially flat outer peripheral sealing surface 24. If desired, or necessary, one or more center supports 26 can optionally be added to the solid extension 12 to provide additional strength and durability.

To effectively block the flow of exhaust gas over the top of the catalyst element 4, the solid extension 12 is preferably shaped and sized to correspond to and fill the lateral interior cross-sectional shape (i.e., the cross-sectional shape which is perpendicular to the longitudinal axis 28 of converter housing 2) of insertion channel 6. Thus, when the inventive catalyst element 20 is inserted into housing 2, the inventive extension 12 projects into and essentially blocks the lateral cross section of the insertion channel 6.

To ensure that the insertion channel 6 is completely blocked and that no leakage can occur, the inventive converter assembly 15 and/or catalyst element 20 will preferably include one or more gaskets or other sealing elements effective for sealing (a) between the bottom of cover 8 and the top surface 30 of extension 12 and (b) between the outer side walls 32 of extension 12 and the inner side walls 34 of insertion channel 6. In a particularly preferred embodiment of the present invention, a single gasket or seal strip 14 is bonded or otherwise attached around the entire periphery of inventive catalyst element 20. The gasket or seal strip 14 preferably comprises a strip of gasket tape. An example of a single piece gasket material particularly well suited for use in the present invention is vermiculite-coated, fiberglass gasket tape.

The inventive catalytic converter assembly 15 can include one or a plurality of the inventive catalyst elements 20. Further, in addition to the desirable sealing properties provided by the inventive catalyst element extension 12, the inventive extension 12 also provides a convenient handle for inserting and removing the inventive catalyst element 20.

Figure 6:
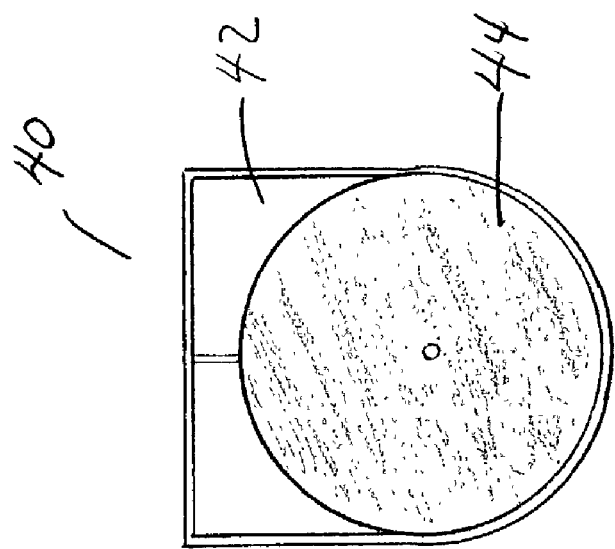
FIG. 6 provides a front elevational view of another embodiment 40 the inventive catalytic converter element.

Although the inventive catalytic converter assembly 15 depicted in FIG. 4 utilizes an octagonal catalyst element 4, it will be understood that the housing of the inventive converter assembly can be configured to utilize circular catalyst elements, oval catalyst elements, or other catalyst elements having generally any desired shape. An alternative embodiment 40 of the inventive catalyst element comprising an inventive solid extension 42 secured to and projecting radially from a round catalyst element 44 is depicted in FIG. 6.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A catalytic converter comprising: a housing having a longitudinal flow passage; at least one catalyst element removably positionable in said housing across said longitudinal flow passage; an insertion channel projecting outwardly from said housing for insertion of said catalyst element, said insertion channel having an outer end spaced outwardly from said housing; and a cover removably positionable on said outer end, the improvement comprising a solid extension which is impervious to gas flow and is secured on and extends from said catalyst element such that, when said catalyst element is positioned in said housing, said solid extension will project into said insertion channel in a manner effective to at least partially block flow around said catalyst element through said insertion channel.

2. The catalytic converter of claim 1 wherein the improvement further comprises a sealing element attached to at least an outer portion of said solid extension for sealing against said cover.

3. The catalytic converter of claim 1 wherein:
said catalyst element has an outer periphery and
said solid extension is secured on and projects radially outward from a portion of said outer periphery.

4. The catalytic converter of claim 3 wherein the improvement further comprises a peripheral sealing element attached to and extending around said catalyst element and said solid extension.

5. The catalytic converter of claim 4 wherein said peripheral sealing element is a tape gasket attached peripherally around said catalyst element and said solid extension.

6. The catalytic converter of claim 3 wherein said catalyst element is substantially octagonal in shape.

7. The catalytic converter of claim 3 wherein said catalyst element is substantially circular in shape.

8. The catalytic converter of claim 1 wherein the improvement further comprises a plurality of said catalyst elements removably positionable in said housing across said longitudinal flow passage, each of said catalyst elements having a solid extension which is impervious to gas flow and is secured on and extends from said catalyst element for projecting into said insertion channel.

* * * * *